(12) United States Patent
Takamatsu

(10) Patent No.: US 10,578,185 B2
(45) Date of Patent: Mar. 3, 2020

(54) SHOCK ABSORBER

(71) Applicant: KYB Corporation, Tokyo (JP)

(72) Inventor: Shinichi Takamatsu, Tokyo (JP)

(73) Assignee: KYB Corporation, Tokyo (JP)

(*) Notice: Subject to any disclaimer, the term of this patent is extended or adjusted under 35 U.S.C. 154(b) by 0 days.

(21) Appl. No.: 15/758,951

(22) PCT Filed: Sep. 9, 2016

(86) PCT No.: PCT/JP2016/076680
§ 371 (c)(1),
(2) Date: Mar. 9, 2018

(87) PCT Pub. No.: WO2017/047526
PCT Pub. Date: Mar. 23, 2017

(65) Prior Publication Data
US 2018/0259028 A1    Sep. 13, 2018

(30) Foreign Application Priority Data
Sep. 14, 2015 (JP) ................. 2015-180974

(51) Int. Cl.
*F16F 9/348* (2006.01)
*F16F 9/34* (2006.01)
*F16F 9/512* (2006.01)

(52) U.S. Cl.
CPC .......... *F16F 9/3481* (2013.01); *F16F 9/3405* (2013.01); *F16F 9/512* (2013.01); *F16F 2230/0082* (2013.01)

(58) Field of Classification Search
CPC .. F16F 9/3481; F16F 2230/0082; F16F 9/512; F16F 9/3405

USPC ................ 188/280, 281, 282.5, 282.6, 283.1
See application file for complete search history.

(56) References Cited

U.S. PATENT DOCUMENTS

| 4,596,270 A * | 6/1986 | Yang ......................... F16F 9/34 137/493 |
| 8,757,336 B2 * | 6/2014 | Morita .................. F16F 9/3405 188/282.5 |
| 2009/0038896 A1 | 2/2009 | Nishi et al. |
| 2011/0247906 A1 | 10/2011 | Morita |

(Continued)

FOREIGN PATENT DOCUMENTS

| CN | 2265311 Y | 10/1997 |
| CN | 101363496 A | 2/2009 |

(Continued)

OTHER PUBLICATIONS

Translation of Japanese Patent No. JPH 0979422 description obtained from website: https://worldwide.espacenet.com/ dated Aug. 29, 2019.*

*Primary Examiner* — Pamela Rodriguez
(74) *Attorney, Agent, or Firm* — Rabin & Berdo, P.C.

(57) ABSTRACT

A shock absorber includes a cylinder in which a working fluid is sealed, a piston rod movable into and out of the cylinder, the piston rod extending from the cylinder, a piston disposed inside the cylinder, the piston being configured to partition a first fluid chamber and a second fluid chamber, and a choke portion formed by penetration of a seamless choke passage, the seamless choke passage being configured to allow the first fluid chamber to communicate with the second fluid chamber.

7 Claims, 9 Drawing Sheets

(56) References Cited

U.S. PATENT DOCUMENTS

2014/0332332 A1* 11/2014 Lawler .................. F16F 9/3484
                                                                          188/313
2015/0192184 A1    7/2015  Yamada

FOREIGN PATENT DOCUMENTS

| DE | 1932373 A1 | 1/1971 |
|---|---|---|
| DE | 3913912 A1 * | 10/1990 |
| DE | 102014225346 A1 | 6/2016 |
| FR | 845638 A | 8/1939 |
| JP | H0577696 U | 10/1993 |
| JP | H09-079422 A | 3/1997 |
| JP | H11-166574 A | 6/1999 |
| JP | 2010-0169256 A | 8/2010 |
| JP | 2012-167785 A | 9/2012 |
| JP | 2015-081639 A | 4/2015 |
| WO | WO-2014/010343 A1 | 1/2014 |

* cited by examiner

SHOCK ABSORBER

TECHNICAL FIELD

The present invention relates to a shock absorber.

BACKGROUND ART

A shock absorber is mounted, for example, to a vehicle such as an automobile and reduces vibration of a vehicle body by generating a damping force. In such a shock absorber, it is proposed to employ a choke passage that generates a damping force when a piston speed is low.

JP2012-167785A discloses a shock absorber that includes a cylinder, a rod movably inserted inside the cylinder, and a piston that is brought into sliding contact with an inner periphery of the cylinder to partition the inside of the cylinder into two action chambers. A case member with an approximately cylindrical shape is screwed with a distal end of the rod. The piston is formed in an annular shape and held on the outer periphery of the case member to be coupled to the rod.

In this shock absorber, a choke member is inserted into the case member. A choke groove with a spiral pattern is disposed on the outer periphery of the choke member. The inner peripheral surface of the case member and the choke groove form a choke passage with a spiral pattern that communicates with the two action chambers inside the cylinder.

SUMMARY OF INVENTION

Since the choke passage of the shock absorber disclosed by JP2012-167785A is formed with the inner peripheral surface of the case member and the choke groove of the choke member, a working fluid may leak from the choke groove when the inner diameter of the case member is large compared with the outer diameter of the choke member. When the inner diameter of the case member is too small compared with the outer diameter of the choke member, the choke groove may be deformed in insertion of the choke member into the case member. The leakage of the working fluid from the choke groove and deformation of the choke groove might not generate a desirable damping force from the choke passage.

Thus, in the shock absorber disclosed by JP2012-167785A, to generate a desirable damping force, it is necessary to severely control dimensional tolerances of both the case member and the choke member, and sophisticated technique is required in manufacturing the shock absorber.

An object of the present invention is to provide a shock absorber that ensures facilitated manufacturing.

According to one aspect of the present invention, a shock absorber includes a cylinder in which a working fluid is sealed, a piston rod movable into and out of the cylinder, the piston rod extending from the cylinder, a piston disposed inside the cylinder, the piston being configured to partition a first fluid chamber and a second fluid chamber, and a choke portion formed by penetration of a seamless choke passage, the seamless choke passage being configured to allow the first fluid chamber to communicate with the second fluid chamber.

DESCRIPTION OF EMBODIMENTS

The following describes a shock absorber according to an embodiment of the present invention with reference to the drawings. Here, while a description will be given of a hydraulic shock absorber where a hydraulic oil is employed as a working fluid, other fluids such as an operating water may be employed as a working fluid.

First Embodiment

First, a description will be given of a shock absorber 100 according to the first embodiment of the present invention with reference to FIG. 1 to FIG. 3. The shock absorber 100 is a device that is disposed, for example, between a vehicle body and a vehicle axle of a vehicle (not illustrated) to reduce vibrations of the vehicle by generating a damping force, and is also referred to as "a mono-tube shock absorber."

Figure 1:
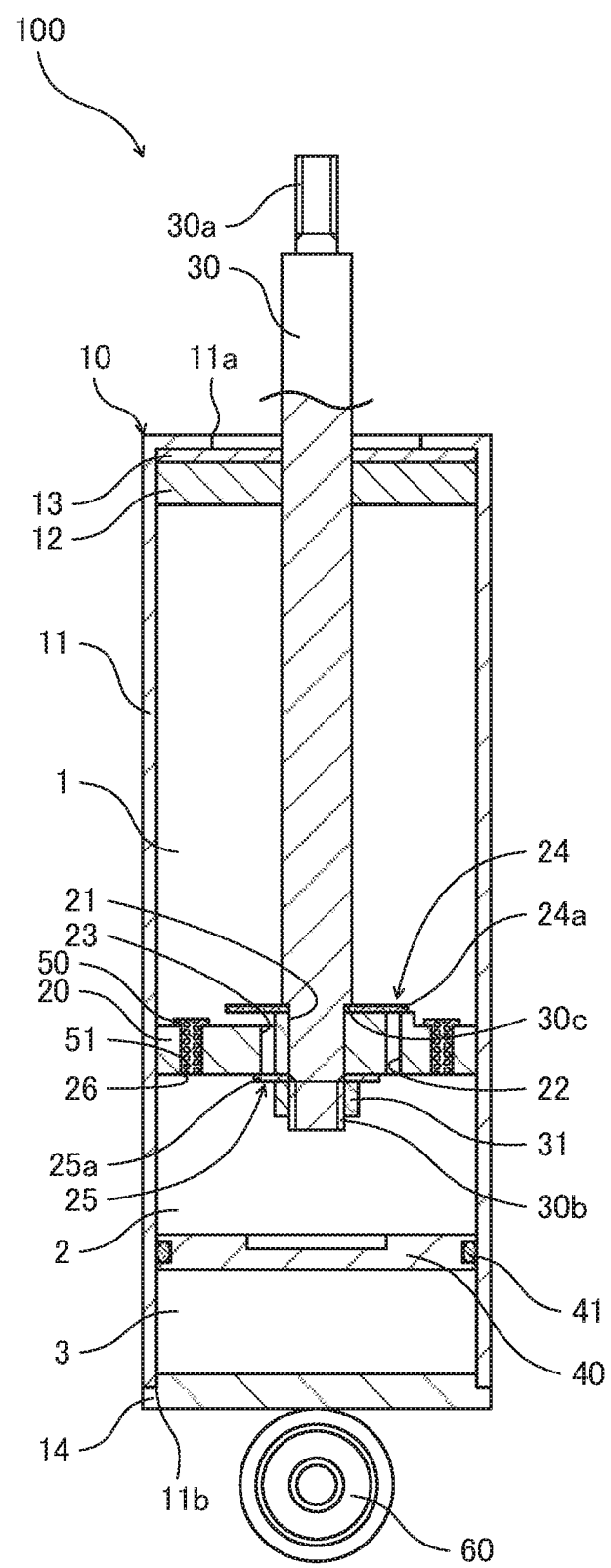
FIG. 1 is a cross-sectional view of a shock absorber according to a first embodiment of the present invention.

As illustrated in FIG. 1, the shock absorber 100 includes a cylinder 10 where the hydraulic oil is sealed, a piston 20 as a valve disk that is slidably inserted inside the cylinder 10, and a piston rod 30 that is movably inserted into and out of the cylinder 10. The piston rod 30 is coupled to the piston 20 and extends outside the cylinder 10.

The cylinder 10 includes a tube 11 with an approximately cylindrical shape, a rod guide 12 and an oil seal 13 disposed at one end portion of the tube 11, and a cap member 14 disposed at the other end portion of the tube 11.

The rod guide 12 slidably supports the piston rod 30. The oil seal 13 prevents the hydraulic oil from leaking from the cylinder 10 and also prevents a foreign material from flowing inside the cylinder 10. The piston rod 30 and the oil seal 13 close one opening 11*a* of the tube 11. The rod guide 12 and the oil seal 13 are fixed to the tube 11 by a caulking processing that bends and folds one end portion of the cylindrically-shaped tube 11 inward.

The cap member 14 is fixed to the tube 11 by welding and closes the other opening 11*b* of the tube 11. By forming the tube 11 into a closed-bottomed cylindrical shape by a plastic work, the other end of the tube 11 may be closed without locating the cap member 14 in the tube 11.

The cap member 14 includes a coupling member 60 to be mounted to a vehicle. An outer peripheral surface at one end portion of the piston rod 30 includes a male screw 30*a* to be screwed with a coupling portion (not illustrated) of a vehicle. Mounting the coupling member 60 to a vehicle and screwing the male screw 30a to a coupling portion of a vehicle mount the shock absorber 100 to a vehicle.

The piston 20 is formed in an annular shape having a hole 21 at its center. The other end portion of the piston rod 30 is inserted into the hole 21 of the piston 20. The outer peripheral surface at the other end portion of the piston rod 30 includes a male screw 30b. Screwing a nut 31 with the male screw 30b fixes the piston 20 at the one end portion of the piston rod 30.

The piston 20 partitions the inside of the cylinder 10 into an extension-side chamber 1 (a fluid chamber) positioning on the rod guide 12 side with respect to the piston 20 and a contraction-side chamber 2 (a fluid chamber) positioning on the cap member 14 side with respect to the piston 20. The hydraulic oil is sealed in the extension-side chamber 1 and the contraction-side chamber 2.

The shock absorber 100 includes a free piston 40 that defines a gas chamber 3 inside the cylinder 10. The gas chamber 3 positions on the cap member 14 side with respect to the contraction-side chamber 2 and is separated from the contraction-side chamber 2 by the free piston 40. The gas is sealed in the gas chamber 3.

The free piston 40 is slidably inserted into the cylinder 10. The outer periphery of the free piston 40 includes a sealing member 41 that holds air tightness of the gas chamber 3.

When the shock absorber 100 contracts and the piston rod 30 is inserted into the cylinder 10, the free piston 40 moves in a direction that decreases the gas chamber 3 in size, and the gas chamber 3 contracts by the volume of the piston rod 30 that has been inserted. When the shock absorber 100 extends and the piston rod 30 moves out of the cylinder 10, the free piston 40 moves in a direction that increases the gas chamber 3 in size, and the gas chamber 3 expands by the volume of the piston rod 30 that has moved out. Thus, the gas chamber 3 compensates for a volume change inside the cylinder 10 in accordance with an operation of the shock absorber 100.

Figure 2:
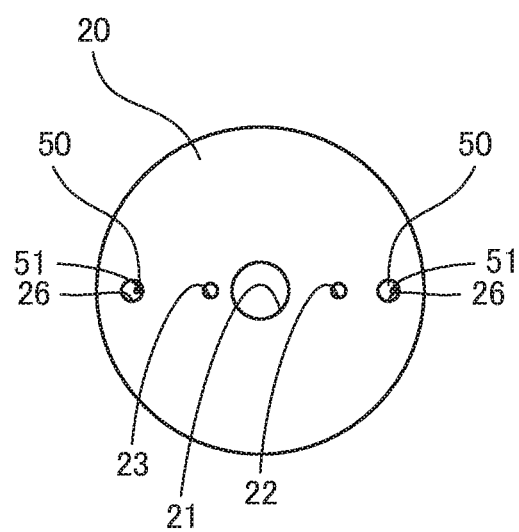
FIG. 2 is a bottom view of a piston in FIG. 1.

FIG. 2 is a bottom view viewed the piston 20 from the contraction-side chamber 2 side. As illustrated in FIG. 1 and FIG. 2, the piston 20 includes passages 22 and 23 that allow the extension-side chamber 1 to communicate with the contraction-side chamber 2. On the extension-side chamber 1 side of the piston 20, a damping valve 24 including an annular leaf valve 24a is disposed. On the contraction-side chamber 2 side of the piston 20, a damping valve 25 including an annular leaf valve 25a is disposed.

The damping valve 24 is sandwiched by a stepped portion 30c formed on the outer peripheral surface of the piston rod 30 and the piston 20. The damping valve 25 is sandwiched by the piston 20 and the nut 31.

In a contraction operation of the shock absorber 100, the piston 20 moves in a direction that increases the extension-side chamber 1 in size and decreases the contraction-side chamber 2 in size. Consequently, the pressure in the extension-side chamber 1 decreases and the pressure in the contraction-side chamber 2 increases. With a pressure difference between the extension-side chamber 1 and the contraction-side chamber 2, the damping valve 24 opens to permit the flow of the hydraulic oil in the passage 22. At this time, the damping valve 25 keeps a valve-closed state to cut off the flow of the hydraulic oil in the passage 23.

In association with the opening of the damping valve 24, the hydraulic oil inside the contraction-side chamber 2 moves into the extension-side chamber 1 through the passage 22. At this time, the damping valve 24 provides resistance to the flow of the hydraulic oil, which moves into the extension-side chamber 1 through the passage 22. That is, the damping valve 24 is a damping force generating portion in the contraction operation.

In an extension operation of the shock absorber 100, the piston 20 moves in a direction that decreases the extension-side chamber 1 in size and increases the contraction-side chamber 2 in size. Consequently, the pressure of the extension-side chamber 1 increases and the pressure of the contraction-side chamber 2 decreases. With the pressure difference between the extension-side chamber 1 and the contraction-side chamber 2, the damping valve 25 opens to permit the flow of the hydraulic oil in the passage 23. At this time, the damping valve 24 keeps the valve-closed state to cut off the flow of the hydraulic oil in the passage 22.

In association with the opening of the damping valve 25, the hydraulic oil inside the extension-side chamber 1 moves into the contraction-side chamber 2 through the passage 23. At this time, the damping valve 25 provides resistance to the flow of the hydraulic oil, which moves into the contraction-side chamber 2 through the passage 23. That is, the damping valve 25 is the damping force generating portion in the extension operation.

The shock absorber 100 further includes choke portions 50 formed by penetration of seamless choke passages 51. Inner walls of the choke passages 51 are integrally formed. The choke passages 51 bypass the damping valves 24 and 25 to always communicate with the extension-side chamber 1 and the contraction-side chamber 2.

Figure 3:
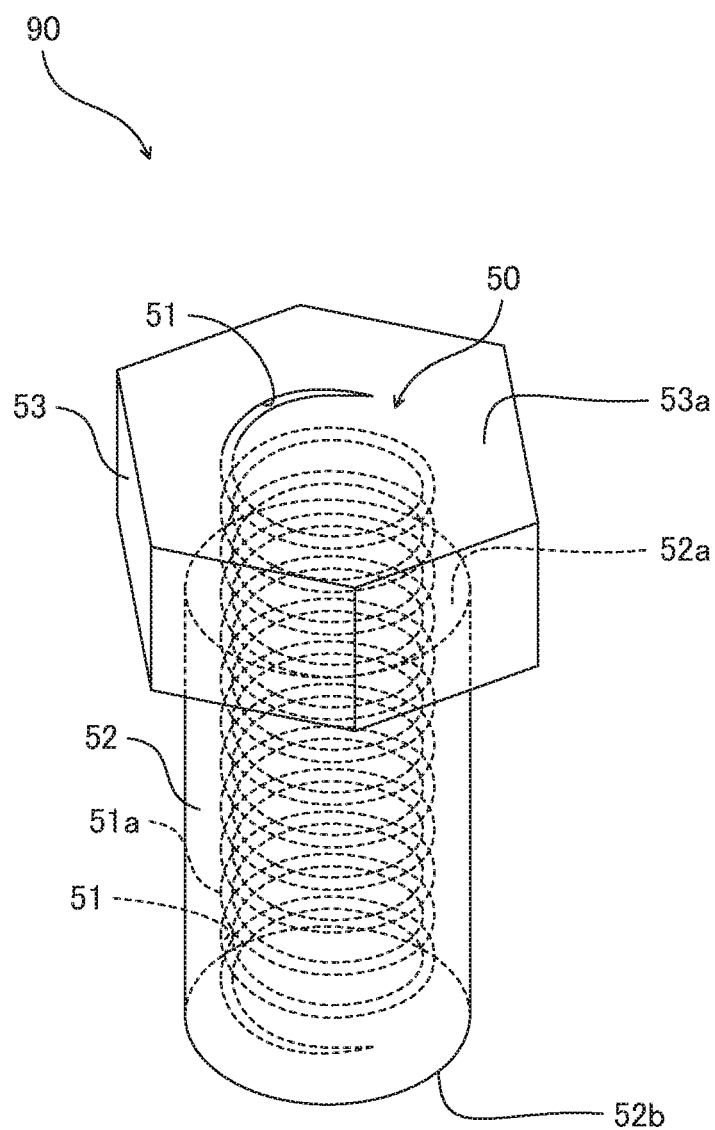
FIG. 3 is a perspective view of a choke portion in FIG. 1.

FIG. 3 is a perspective view of the choke portion 50. As illustrated in FIG. 1 and FIG. 3, the choke portion 50 includes a cylindrically-shaped shaft portion 52 and a hexagonal column-shaped head portion 53 disposed at an end face 52a of the shaft portion 52. The shaft portion 52 and the head portion 53 are integrally formed.

The outer peripheral surface of the shaft portion 52 includes a male screw (not illustrated). The piston 20 includes a plurality of holes 26 having a circular-shaped cross section, and an inner peripheral surface of the respective holes 26 includes a female screw (not illustrated) that is screwed with the male screw of the shaft portion 52. Screwing the male screw of the shaft portion 52 with the female screw of the hole 26 mounts the choke portion 50 to the piston 20.

That is, in this embodiment, the shock absorber 100 further includes screw portions 90 disposed in the piston 20, and the choke portions 50 are disposed in the screw portions 90. The screw portions 90 may be disposed at the cylinder 10 or the piston rod 30.

The plurality of holes 26 are symmetrically positioned relative to a central axis of the piston 20, and the plurality of choke portions 50 are symmetrically arranged relative to the central axis of the piston 20. Consequently, the center of gravity of the piston 20 is easily positioned on the central axis of the piston 20, and this ensures prevention of displacement of the piston 20.

The configuration of the choke portion 50 is not limited to the configuration where the choke portion 50 is mounted to the piston 20 by screwing of a male screw and a female screw. For example, the outer diameter of the shaft portion 52 is formed to be approximately identical to the inner diameter of the hole 26, and the choke portion 50 may be mounted to the piston 20 by fit of the hole 26 and the shaft portion 52.

The choke passage 51 is seamlessly formed in a spiral pattern in an axial direction of the shaft portion 52 from another end face (a first end face of the choke portion 50) 52b of the shaft portion 52 to a top surface (a second end face of the choke portion 50) 53a of the head portion 53. The choke portion 50 including such choke passage 51 is manufactured by an additive manufacturing technology, which uses a 3D printer or similar device.

The choke passage 51 generates a damping force when a speed of the piston 20 is low. A description will be specifically given of generation of the damping force by the choke passage 51.

When the speed of the piston 20 is low, and the pressure difference between the extension-side chamber 1 and the contraction-side chamber 2 is small, the damping valves 24 and 25 sometimes do not open. In this case, because the damping valve 24 cuts off the flow of the hydraulic oil in the passage 22, and the damping valve 25 cuts off the flow of the hydraulic oil in the passage 23, the hydraulic oils inside the extension-side chamber 1 and the contraction-side chamber 2 do not pass through the passages 22 and 23, and the damping valves 24 and 25 do not generate the damping force.

Since the choke passages 51 are formed by bypassing the damping valves 24 and 25, the flows of the hydraulic oils in the choke passages 51 are permitted regardless of open and close of the damping valves 24 and 25. Consequently, in the operation of the shock absorber 100, the hydraulic oil inside the cylinder 10 passes through the choke passages 51 to move back and forth between the extension-side chamber 1 and the contraction-side chamber 2. At this time, the choke passages 51 provide resistance to the flow of the hydraulic oil passing through the choke passages 51.

Thus, the choke passages 51 generate the damping force at a low speed of the piston 20.

The damping force by the choke passage 51 depends on a flow-passage cross section (which is a cross section perpendicular to a flow direction of the hydraulic oil) of the choke passage 51 and a flow-passage length (which is a length along the flow direction of the hydraulic oil) of the choke passage 51. Specifically, the smaller the flow-passage cross section of the choke passage 51, the larger the damping force by the choke passage 51 is, and the longer the flow-passage length of the choke passage 51 is, the larger the damping force by the choke passage 51 is. In view of this, the flow-passage cross section and the flow-passage length of the choke passage 51 are designed corresponding to the damping force required at a low speed of the piston 20.

To further increase the damping force by the choke passage 51, it is conceivable to decrease the flow-passage cross section of the choke passage 51. However, decreasing the flow-passage cross section of the choke passage 51 may cause a solid in the hydraulic oil to be clogged in the choke passage 51.

For example, a foreign material may be contained in the hydraulic oil. A magneto-rheological fluid shock absorber contains microparticles with ferromagnetism in the hydraulic oil. Clogging of solids such as a foreign material and/or microparticles with ferromagnetism in the choke passage 51 may cause the flow of the hydraulic oil in the choke passage 51 to be cut off, and the choke passage 51 might not operate as the damping force generating portion.

From such a reason, it is preferable to increase the damping force by the choke passage 51 by lengthening of the flow-passage length of the choke passage 51.

In the embodiment, since the choke passage 51 is formed in a spiral pattern, it is not necessary for the choke portion 50 to have a length identical to the flow-passage length of the choke passage 51. That is, even if the flow-passage length of the choke passage 51 is extended, it is not necessary to increase the size of the choke portion 50 in the axial direction of the cylinder 10. Consequently, the shock absorber 100 enables generating a larger damping force in a small size.

In the embodiment, since the choke passage 51 is formed by penetrating the choke portion 50, it is only necessary to control the dimensional tolerances of the choke portions 50, and there is no need to severely control the dimensional tolerances of the portions other than the choke portions 50, for example, the dimensional tolerances of the holes 26 of the piston 20. Therefore, this ensures facilitated manufacturing of the shock absorber 100.

The choke passage 51 is not limited to a configuration of being formed in a spiral pattern; it is only necessary to be formed in a shape having a bent portion 51a, and it may be formed, for example, in a whirl shape, in a zigzag shape, in an approximately annular and zigzag shape, or in an approximately annular and spiral pattern. The choke passage 51 may have a shape illustrated in FIG. 4, FIG. 5, and FIG. 6.

Figure 4:
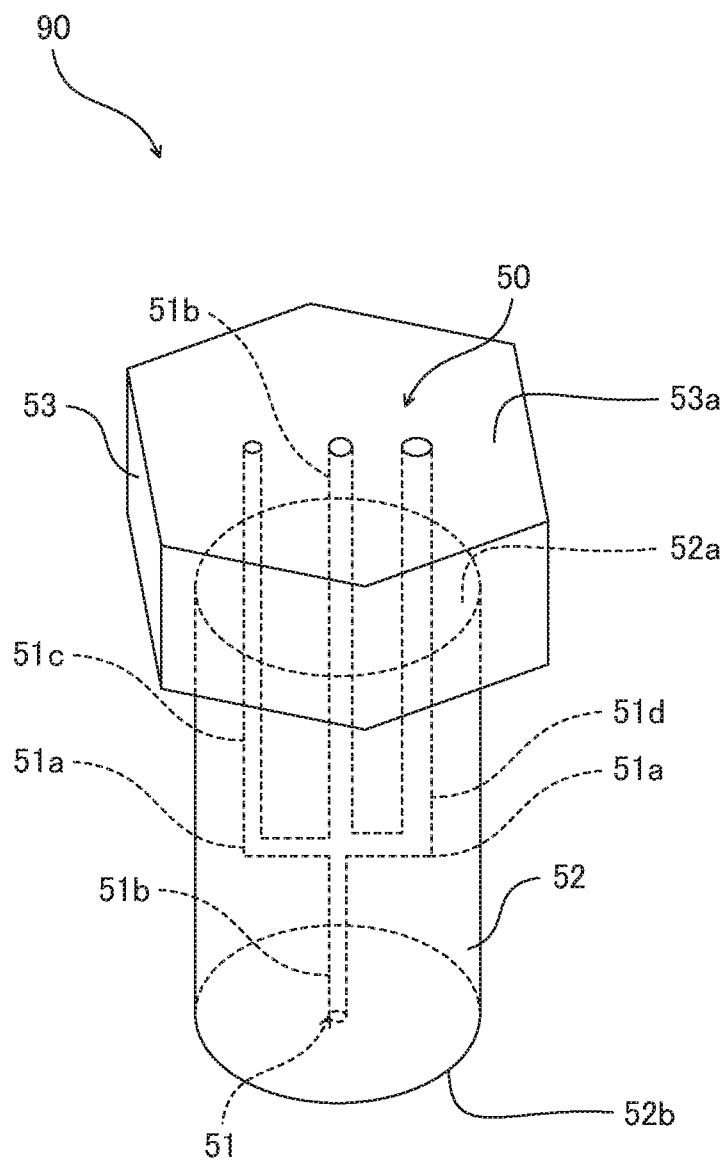
FIG. 4 is a perspective view illustrating another example of a choke portion.

FIG. 4 is a perspective view illustrating one example of the choke passage 51. In the example illustrated in FIG. 4, the choke passage 51 includes a linear through passage portion 51b that penetrates between the first end face 52b and the second end face 53a of the choke portion 50, and branch passage portions 51c and 51d that branch from the through passage portion 51b. The branch passage portions 51c and 51d have openings at the second end face 53a. Then, the branch passage portions 51c and 51d are bent. That is, the branch passage portions 51c and 51d include the bent portions 51a. The bent portion 51a may be bent or may be curved.

Since the choke passage 51 includes the bent portions 51a, the choke portion 50 does not need to have a length identical to the flow-passage length of the choke passage 51. Consequently, the shock absorber 100 enables generating a larger damping force in a small size.

As illustrated in FIG. 4, the flow-passage cross sections of the passage portions 51b, 51c, and 51d may be different.

Figure 5:
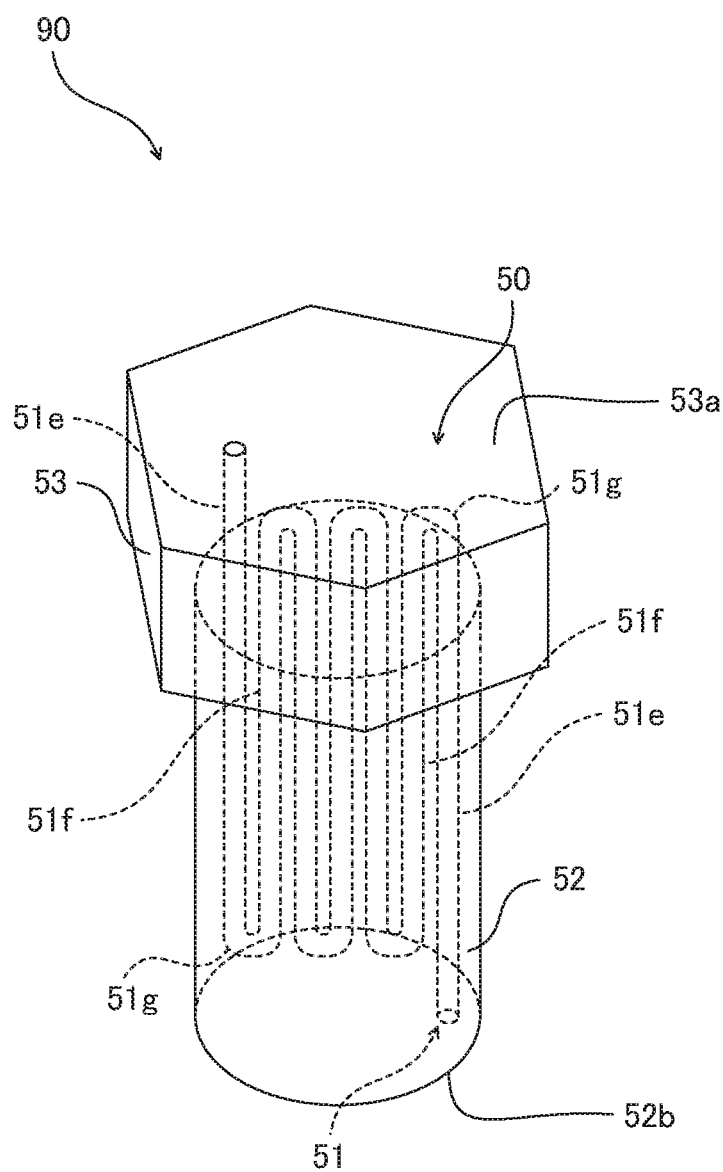
FIG. 5 is a perspective view illustrating another example of a choke portion.

FIG. 5 is a perspective view illustrating another example of the choke passage 51. In the example illustrated in FIG. 5, the choke passage 51 includes first passage portions 51e that linearly extend from openings of the choke passage, second passage portions 51f that linearly extend along the first passage portions 51e, and coupling portions 51g that couple the first passage portions 51e to the second passage portions 51f. The coupling portions 51g change the direction of the flow of the hydraulic oil to an opposite direction.

Since the coupling portions 51g change the direction of the flow of the hydraulic oil to an opposite direction, the choke portion 50 does not need to have a length identical to the flow-passage length of the choke passage 51. Consequently, the shock absorber 100 enables generating a larger damping force in a small size.

Figure 6:
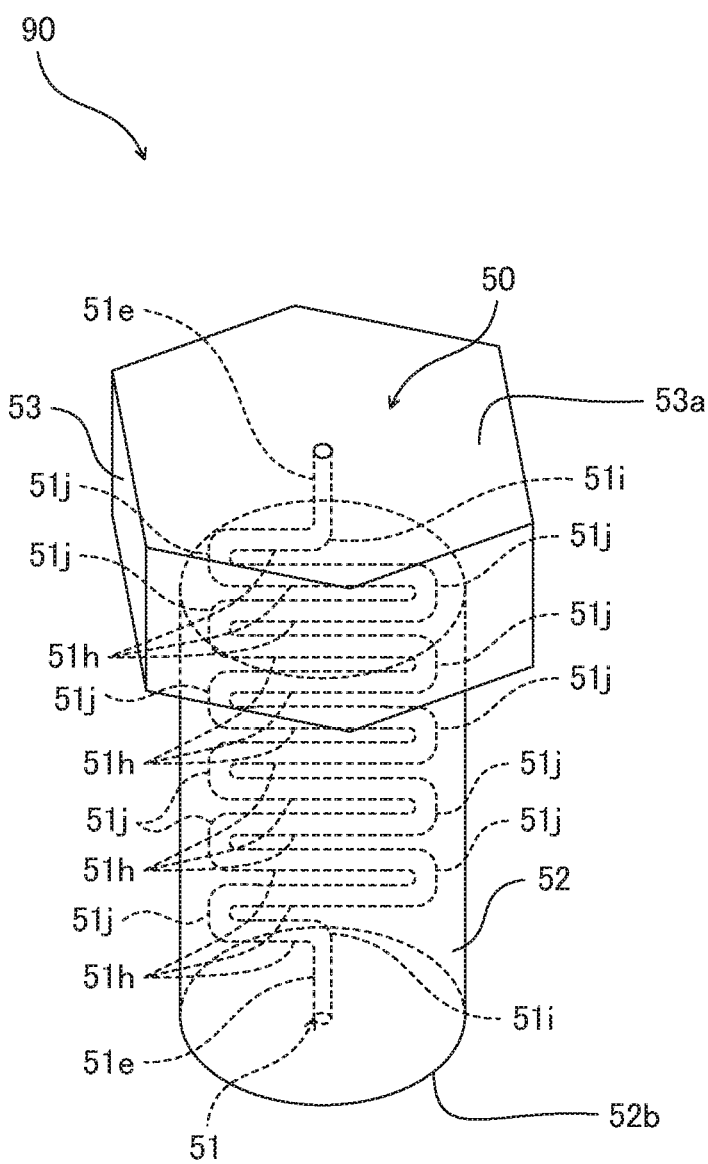
FIG. 6 is a perspective view illustrating further another example of a choke portion.

FIG. 6 is a perspective view illustrating further another example of the choke passage 51. In the example illustrated in FIG. 6, the choke passage 51 includes the first passage portions 51e that linearly extend from the openings of the choke passage, a plurality of second passage portions 51h that linearly extend in a direction approximately perpendicular to an extension direction of the first passage portions 51e, first coupling portions 51i that couple the first passage portion 51e to one of the plurality of second passage portions 51h, and second coupling portions 51j that mutually couples the second passage portions. The first coupling portions 51i change the direction of the flow of the hydraulic oil by approximately 90 degrees. The second coupling portions 51*j* change the direction of the flow of the hydraulic oil to an opposite direction.

Since the first coupling portions 51*i* change the direction of the flow of the hydraulic oil by approximately 90 degrees, and the second coupling portions 51*j* change the direction of the flow of the hydraulic oil to an opposite direction, the choke portion 50 does not need to have a length identical to the flow-passage length of the choke passage 51. Consequently, the shock absorber 100 enables generating a larger damping force in a small size.

The extension direction of the second passage portion 51*h* does not need to be approximately orthogonal to the extension direction of the first passage portion 51*e*; it is only necessary that it intersects with the extension direction of the first passage portion 51*e*. The first coupling portion 51*i* does not need to change the direction of the flow of the hydraulic oil by approximately 90 degrees; it is only necessary that it can change the direction of the flow of the hydraulic oil by an angle between the first passage portion and the second passage portion.

Figure 7:
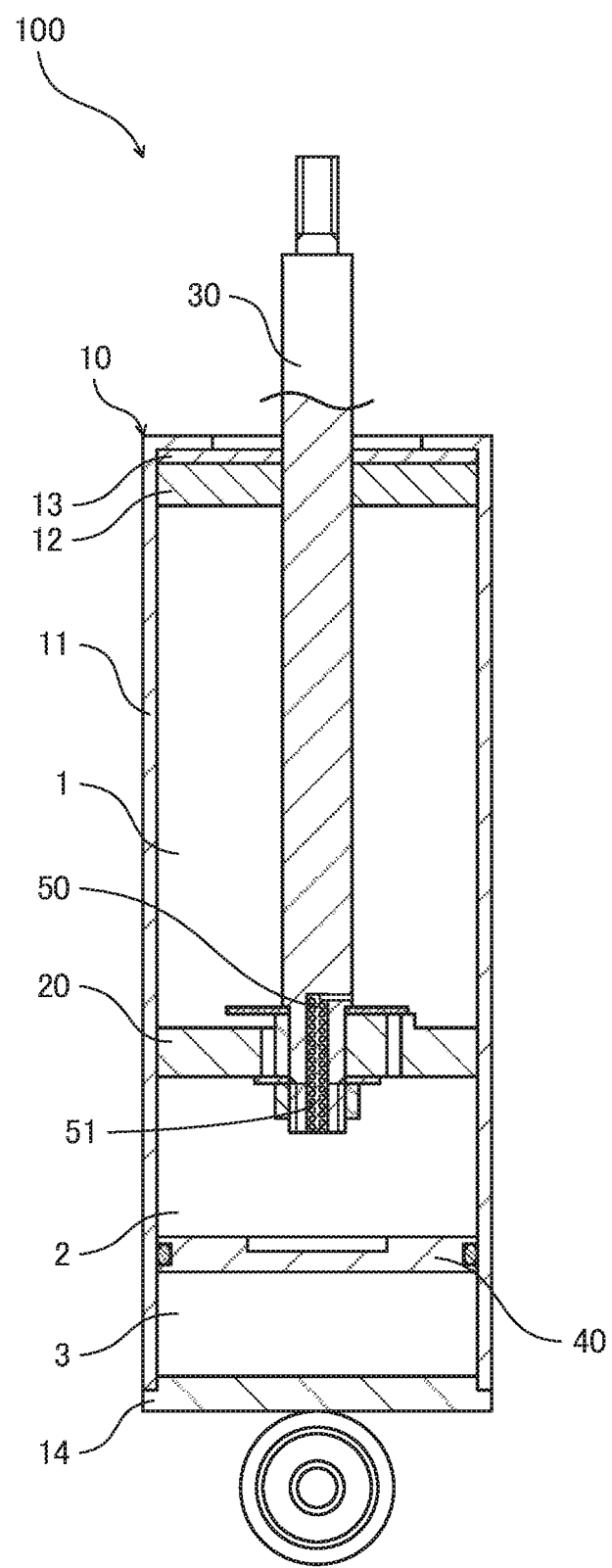
FIG. 7 is a cross-sectional view of the shock absorber according to the first embodiment of the present invention, and illustrates a configuration where the choke portion is mounted to a piston rod.

As illustrated in FIG. 7, the choke portion 50 may be mounted to the piston rod 30. Although not illustrated, the choke portion 50 may be mounted to the cylinder 10.

Since the choke portion 50 is formed separately from the cylinder 10, the piston 20, and the piston rod 30 and mounted to the cylinder 10, the piston 20, or the piston rod 30, the choke portion 50 is easily replaced. Consequently, in changing the flow-passage length or the shape of the choke passage 51, it is only necessary to replace the choke portion 50, and there is no need to apply changes to the cylinder 10, the piston 20, and the piston rod 30. Therefore, this ensures enhanced versatility of the shock absorber 100.

Figure 8:
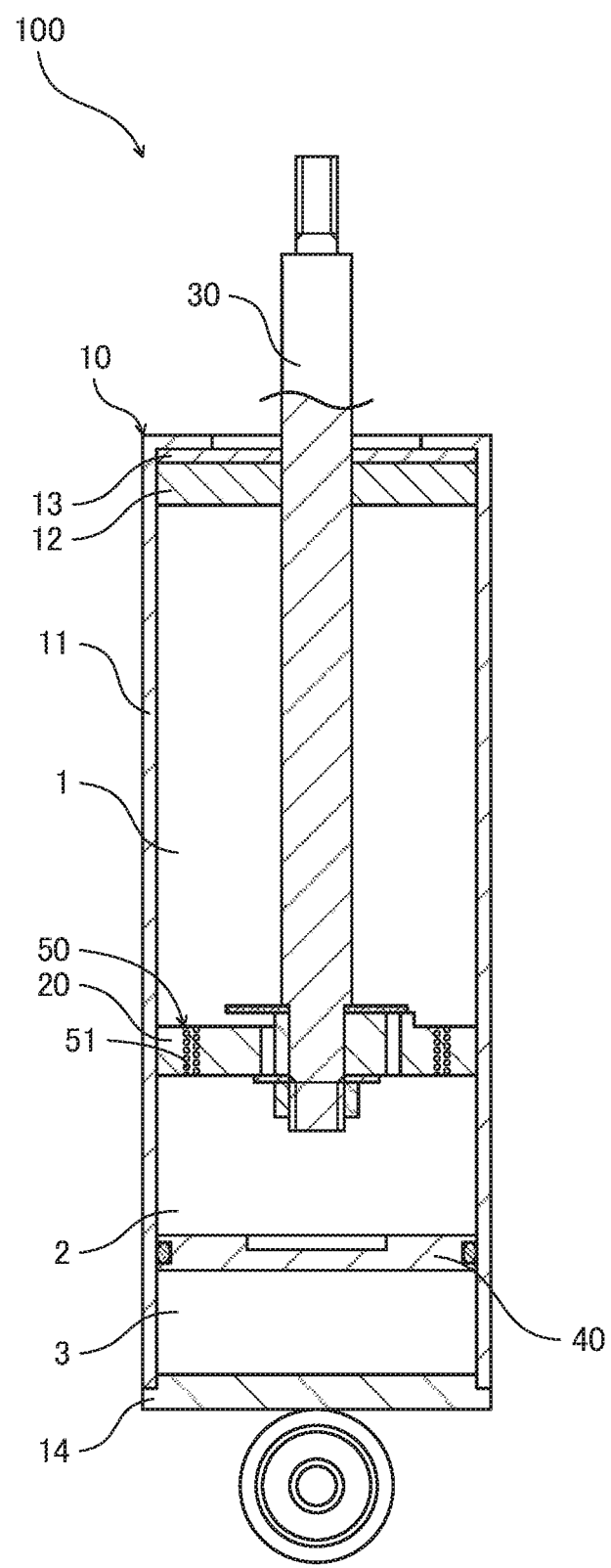
FIG. 8 is a cross-sectional view of the shock absorber according to the first embodiment of the present invention, and illustrates a configuration where the choke portion is integrally formed with a piston.

As illustrated in FIG. 8, the choke portion 50 may be integrally formed with the piston 20, or although not illustrated, it may be integrally formed with the cylinder 10 or the piston rod 30. Integrally forming the choke portion 50 with the cylinder 10, the piston 20, or the piston rod 30 eliminates the need for a process mounting the choke portion 50 to the cylinder 10, the piston 20, or the piston rod 30, in manufacturing the shock absorber 100. Therefore, this ensures shortening a manufacturing time for the shock absorber 100.

The cylinder 10, the piston 20, or the piston rod 30, which are integrally formed with the choke portion 50, is manufactured by the additive manufacturing technology, which uses a 3D printer or similar device.

Next, a description will be given of operations of the shock absorber 100 with reference to FIG. 1.

First, a description will be given of the contraction operation of the shock absorber 100.

In the contraction operation of the shock absorber 100, the piston 20 moves in a direction that increases the extension-side chamber 1 in size and decreases the contraction-side chamber in size. As a result, the pressure of the extension-side chamber 1 is decreased, and the pressure of the contraction-side chamber 2 is increased.

When the speed of the piston 20 is high, the pressure difference between the extension-side chamber 1 and the contraction-side chamber 2 is large, and the damping valve 24 opens to permit the flow of the hydraulic oil in the passage 22. At this time, the damping valve 25 keeps the valve-closed state to cut off the flow of the hydraulic oil in the passage 23. Consequently, the hydraulic oil inside the contraction-side chamber 2 moves into the extension-side chamber 1 through the passage 22 and the choke passages 51.

The damping valve 24 provides resistance to the flow of the hydraulic oil moving into the extension-side chamber 1 through the passage 22, and causes the pressure difference between the extension-side chamber 1 and the contraction-side chamber 2 to generate the damping force.

The flow-passage cross section of the choke passage 51 is smaller than the flow-passage cross section of the passage 22; the amount of the hydraulic oil flowing through the choke passage 51 is small compared with the amount of the hydraulic oil flowing through the passage 22. Consequently, a resistance force caused to the flow of the hydraulic oil passing through the choke passage 51 is smaller than the resistance force caused to the flow of the hydraulic oil passing through the damping valve 24: That is, the damping force of the shock absorber 100 is hardly generated by the choke passage 51, and is mainly generated by the damping valve 24.

When the speed of the piston 20 is low, the pressure difference between the extension-side chamber 1 and the contraction-side chamber 2 is small. Consequently, the damping valves 24 and 25 keep the valve-closed state to cut off the flow of the hydraulic oil in the passages 22 and 23. Thus, the hydraulic oil inside the contraction-side chamber 2 moves into the extension-side chamber 1 through the choke passages 51.

The choke passages 51 provide resistance to the flow of the hydraulic oil moving into the extension-side chamber 1 through the choke passages 51, and cause the pressure difference between the extension-side chamber 1 and the contraction-side chamber 2 to generate the damping force. That is, the damping force of the shock absorber 100 is generated by the choke passages 51.

Next, a description will be given of the extension operation of the shock absorber 100.

When the speed of the piston 20 is high, the pressure difference between the extension-side chamber 1 and the contraction-side chamber 2 is large, and thus, the damping valve 25 opens and the damping valve 24 keeps the valve-closed state. Consequently, the hydraulic oil inside the extension-side chamber 1 moves into the contraction-side chamber 2 mainly through the passage 23. The damping valve 25 provides resistance to the flow of the hydraulic oil moving into the contraction-side chamber 2 through the passage 23, and causes the pressure difference between the extension-side chamber 1 and the contraction-side chamber 2 to generate the damping force.

When the speed of the piston 20 is low, the pressure difference between the extension-side chamber 1 and the contraction-side chamber 2 is small, and thus, the damping valves 24 and 25 keep the valve-closed state. Consequently, the hydraulic oil inside the extension-side chamber 1 moves into the contraction-side chamber 2 through the choke passages 51. The choke passages 51 provide resistance to the flow of the hydraulic oil moving into the extension-side chamber 1 through the choke passages 51, and cause the pressure difference between the extension-side chamber 1 and the contraction-side chamber 2 to generate the damping force.

Thus, in the shock absorber 100, the damping valves 24 and 25 generate the damping force when the piston 20 is at high speed, and the choke passages 51 generate the damping force when the piston 20 is at low speed. Consequently, the shock absorber 100 ensures generating the damping force regardless of the speed of the piston 20.

The first embodiment described above achieves the following effects.

Since the choke passages 51 are formed by penetrating the choke portion 50, it is only necessary to control the dimensional tolerances of the choke portion 50, and there is no need to severely control the dimensional tolerances of the portions other than the choke portion 50. Therefore, this ensures facilitated manufacturing of the shock absorber 100.

Since the choke passages 51 include the bent portions 51a, there is no need to increase the size of the choke portion 50 in extending the flow-passage length of the choke passages 51. Therefore, the shock absorber 100 enables generating a larger damping force in a small size.

The configuration where the choke portion 50 is formed separately from the cylinder 10, the piston 20, and the piston rod 30, and is mounted to the cylinder 10, the piston 20, or the piston rod 30 facilitates the replacement of the choke portion 50. Therefore, this facilitates the change of the flow-passage length or the shape of the choke passages 51 and ensures enhanced versatility of the shock absorber 100.

The configuration where the choke portion 50 is integrally formed with the cylinder 10, the piston 20, or the piston rod 30 eliminates the need for the process mounting the choke portion 50 to the cylinder 10, the piston 20, or the piston rod 30, in manufacturing the shock absorber 100. Therefore, this ensures shortening the manufacturing time for the shock absorber 100.

Second Embodiment

Next, a description will be given of a shock absorber 200 according to a second embodiment of the present invention, with reference to FIG. 9. The shock absorber 200 is also referred to as "twin-tube shock absorber," and a device that reduces the vibration of a vehicle body by generating the damping force, similarly to the shock absorber 100. Here, like reference numerals designate identical configurations in the first embodiment, and therefore such configurations will not be further elaborated.

Figure 9:
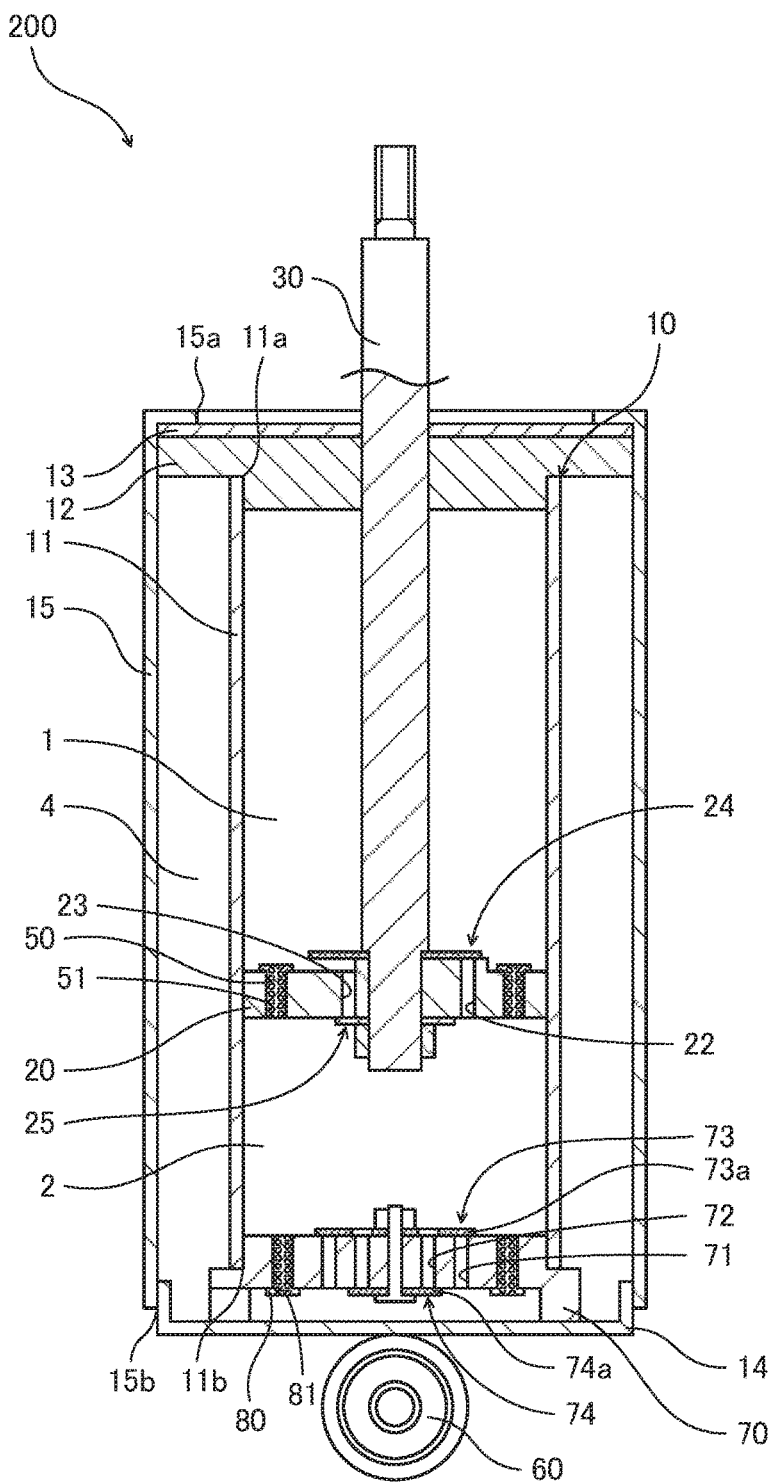
FIG. 9 is a cross-sectional view of a shock absorber according to a second embodiment of the present invention.

As illustrated in FIG. 9, the shock absorber 200 includes an outer tube 15 that is arranged covering the tube 11. In the following, the tube 11 may be referred to as "an inner tube 11" to clearly distinguish it from the outer tube 15.

A reservoir 4 (a fluid chamber) that retains the hydraulic oil is formed between the inner tube 11 and the outer tube 15. The reservoir 4 seals the hydraulic oil and a compressed gas. The compressed gas compensates for the volume change inside the cylinder 10 in association with the operation of the shock absorber 200.

The outer tube 15 is formed in an approximately cylindrical shape. The rod guide 12 and the oil seal 13 are disposed at one end portion of the outer tube 15. The oil seal 13 prevents the hydraulic oil and the compressed gas from leaking from the extension-side chamber 1 and the reservoir 4 and also prevents a foreign material from flowing in the extension-side chamber 1 and the reservoir 4. The rod guide 12 and the oil seal 13 are fixed to the outer tube 15 by the caulking processing that folds the one end portion of the cylindrically-shaped outer tube 15 inward.

The cap member 14 is disposed at the other end portion of the outer tube 15. The cap member 14 is fixed to the outer tube 15 by welding to close another opening 15b of the outer tube 15. The cap member 14 includes the coupling member 60.

In the inner tube 11, a base valve 70 as a valve disk is disposed so as to close the opening 11b of the inner tube 11. Thus, the base valve 70 partitions the contraction-side chamber 2 and the reservoir 4.

The base valve 70 includes passages 71 and 72 that allow the contraction-side chamber 2 to communicate with the reservoir 4. On the contraction-side chamber 2 side of the base valve 70, check valves 73 including an annular leaf valve 73a are disposed. On the reservoir 4 side of the base valve 70, damping valves 74 including an annular leaf valve 74a are disposed.

The check valves 73 open by the pressure difference between the contraction-side chamber 2 and the reservoir 4 in the extension operation of the shock absorber 200, and permits the flow of the hydraulic oil in the passages 71. The check valves 73 keep the valve-closed state to cut off the flow of the hydraulic oil in the passages 71, in the contraction operation of the shock absorber 200.

The damping valves 74 open by the pressure difference between the contraction-side chamber 2 and the reservoir 4 in the contraction operation of the shock absorber 200 to permit the flow of the hydraulic oil through the passages 72, and also provide resistance to the flow of the hydraulic oil moving into the reservoir 4 from the contraction-side chamber 2 through the passages 72. The damping valves 74 keep the valve-closed state to cut off the flow of the hydraulic oil in the passages 72, in the extension operation of the shock absorber 200.

The shock absorber 200 further includes choke portions 80 formed by penetration of choke passages 81. The choke passages 81 bypass the check valves 73 and the damping valves 74 to always allow the contraction-side chamber 2 to communicate with the reservoir 4.

The choke portions 80 are formed separately from the base valve 70, and mounted to the base valve 70. The structures of the choke portions 80 are identical to those of the choke portions 50 (see FIG. 3), and thus its description will be omitted here.

In this embodiment, since the choke passages 81 are formed in a spiral pattern, the choke portions 80 do not need to have a length identical to the flow-passage length of the choke passages 81. That is, there is no need to increase the size of the choke portion 80 in the axial direction of the cylinder 10 even if the flow-passage lengths of the choke passage 81 are extended. Therefore, the shock absorber 200 enables generating a larger damping force in a small size.

In this embodiment, since the choke passages 81 are formed by penetrating the choke portions 80, it is only necessary to control the dimensional tolerances of the choke portions 80, and there is no need to severely control the dimensional tolerances of the portions other than the choke portions 80. Therefore, this ensures facilitated manufacturing of the shock absorber 200.

Since the choke portions 80 are formed separately from the base valve 70 and mounted to the base valve 70, the choke portions 80 are easily replaced. Thus, in changing the flow-passage lengths or the shapes of the choke passages 81, it is only necessary to replace the choke portions 80, and there is no need to apply changes to the base valve 70. Therefore, this ensures enhanced versatility of the shock absorber 200.

The choke portions 80 may be integrally formed with the base valve 70. Integrally forming the choke portions 80 with the base valve 70 eliminates the need for a process mounting the choke portions 80 to the base valve 70, in manufacturing the shock absorber 200. Therefore, this ensures shortening the manufacturing time for the shock absorber 200.

The base valve 70 integrally formed with the choke portions 80 is manufactured by the additive manufacturing technology, which uses a 3D printer or similar device.

Next, a description will be given of operations of the shock absorber 200 with reference to FIG. 9.

First, a description will be given of the contraction operation of the shock absorber 200.

In the contraction operation of the shock absorber 200, the piston 20 moves in a direction that increases the extension-side chamber 1 in size, and decreases the contraction-side chamber in size. As a result, the pressure of the extension-side chamber 1 is decreased, and the pressure of the contraction-side chamber 2 is increased.

When the speed of the piston 20 is high, the pressure difference between the extension-side chamber 1 and the contraction-side chamber 2 is large, and the damping valve 24 opens. Consequently, the hydraulic oil inside the contraction-side chamber 2 moves into the extension-side chamber 1 mainly through the passage 22. The damping valve 24 provides resistance to the flow of the hydraulic oil moving into the extension-side chamber 1 through the passage 22, and causes the pressure difference between the extension-side chamber 1 and the contraction-side chamber 2 to generate the damping force.

When the speed of the piston 20 is high, the pressure difference between the contraction-side chamber 2 and the reservoir 4 is large, and thus the damping valves 74 open to permit the flow of the hydraulic oil in the passages 72. At this time, the check valves 73 keep the valve-closed state to cut off the flow of the hydraulic oil in the passages 71.

In association with the contraction operation of the shock absorber 200, the piston rod 30 is inserted into the cylinder 10, and thus, the hydraulic oil for the volume of the piston rod 30, which has been inserted, moves into the reservoir 4 through the passages 72 and the choke passages 81 from the contraction-side chamber 2.

The damping valves 74 provide resistance to the flow of the hydraulic oil, which moves into the reservoir 4 through the passages 72, and cause the pressure difference between the reservoir 4 and the contraction-side chamber 2 to generate the damping force.

The flow-passage cross section of the choke passage 81 is smaller than the flow-passage cross section of the passage 72, and the amount of the hydraulic oil flowing in the choke passage 81 is small compared with the amount of the hydraulic oil flowing in the passage 72. Consequently, the resistance force caused to the flow of the hydraulic oil passing through the choke passage 81 is smaller than the resistance force caused to the flow of the hydraulic oil passing through the damping valve 74.

That is, when the speed of the piston 20 is high, the damping force of the shock absorber 200 is hardly generated at the choke passages 51 and 81, and is generated mainly by the damping valves 24 and 74.

When the speed of the piston 20 is low, the pressure difference between the extension-side chamber 1 and the contraction-side chamber 2 is small, and the damping valves 24 and 25 keep the valve-closed state. Consequently, the hydraulic oil inside the contraction-side chamber 2 moves into the extension-side chamber 1 through the choke passages 51. The choke passages 51 provide resistance to the flow of the hydraulic oil moving into the extension-side chamber 1 through the choke passages 51, and cause the pressure difference between the extension-side chamber 1 and the contraction-side chamber 2 to generate the damping force.

When the speed of the piston 20 is low, the pressure difference between the contraction-side chamber 2 and the reservoir 4 is small, and thus, the damping valves 74 keep the valve-closed state to cut off the flow of the hydraulic oil in the passages 72. Consequently, the hydraulic oil inside the contraction-side chamber 2 moves into the reservoir 4 through the choke passages 81, by the volume of the piston rod 30, which has been inserted.

The choke passages 81 provide resistance to the flow of the hydraulic oil moving into the extension-side chamber 1 through the choke passages 81, and cause the pressure difference between the reservoir 4 and the contraction-side chamber 2 to generate the damping force.

That is, when the speed of the piston 20 is low, the damping force of the shock absorber 200 is generated by the choke passages 51 and 81.

Next, a description will be given of the extension operation of the shock absorber 200.

When the speed of the piston 20 is high, the pressure difference between the extension-side chamber 1 and the contraction-side chamber 2 is large, and thus, the damping valve 25 opens, and the damping valve 24 keeps the valve-closed state. Consequently, the hydraulic oil inside the extension-side chamber 1 moves into the contraction-side chamber 2 mainly through the passage 23. The damping valve 25 provides resistance to the flow of the hydraulic oil moving into the contraction-side chamber 2 through the passage 23, and causes the pressure difference between the extension-side chamber 1 and the contraction-side chamber 2 to generate the damping force.

When the speed of the piston 20 is low, the pressure difference between the extension-side chamber 1 and the contraction-side chamber 2 is small, and thus, the damping valves 24 and 25 keep the valve-closed state. Consequently, the hydraulic oil inside the extension-side chamber 1 moves into the contraction-side chamber 2 through the choke passages 51. The choke passages 51 provide resistance to the flow of the hydraulic oil moving into the contraction-side chamber 2 through the choke passages 51, and cause the pressure difference between the extension-side chamber 1 and the contraction-side chamber 2 to generate the damping force.

In the extension operation of the shock absorber 200, regardless of a sliding speed of the piston 20, the check valves 73 open to permit the flow of the hydraulic oil in the passages 71. At this time, the damping valves 74 keep the valve-closed state to cut off the flow of the hydraulic oil in the passages 72.

In association with the extension operation of the shock absorber 200, since the piston rod 30 moves out of the cylinder 10, the hydraulic oil for the volume of the piston rod 30, which has moved out, moves into the contraction-side chamber 2 through the passages 71 and the choke passages 81 from the reservoir 4.

Since the flow-passage cross section of the choke passage 81 is smaller than the flow-passage cross sections of the passages 71, the hydraulic oil in the reservoir 4 moves into the contraction-side chamber 2 mainly through the passages 71. Consequently, the choke passages 81 hardly provide resistance to the flow of the hydraulic oil passing through the choke passages 81 and do not generate the damping force.

Thus, in the shock absorber 200, the damping valve 24 or the choke passages 51 and 81 generate the damping force in the contraction operation of the piston 20, and the damping valve 25 or the choke passages 51 generates the damping force in the extension operation of the piston 20. When the sliding speed of the piston 20 is high, the damping valves 24, 25, and 74 generate the damping force. When the sliding speed of the piston 20 is low, the choke passages 51 and 81 generate the damping force. Consequently, the shock absorber 200 enables generating the damping force regardless of the sliding speed of the piston 20.

The following summarizes configurations, actions, and effects according to the embodiments of the present invention.

The shock absorbers 100 and 200 include the cylinder 10 that seals the hydraulic oil, the piston rod 30 that is movable with respect to the cylinder 10 and is extended from the cylinder 10, the piston 20 or the base valve 70 that is disposed in the cylinder 10 to partition the extension-side chamber 1 and the contraction-side chamber 2 or partition the contraction-side chamber 2 and the reservoir 4, and the choke portions 50 and 80 that allow the extension-side chamber 1 to communicate with the contraction-side chamber 2 or allow the contraction-side chamber 2 to communicate with the reservoir 4 and are formed by penetration of the choke passages 51 and 81, which include the bent portions 51a.

Since this configuration is formed by the choke passages 51 and 81 penetrating the choke portions 50 and 80, it is only necessary to control the dimensional tolerances of the choke portions 50 and 80, and there is no need to severely control the dimensional tolerances of the portions other than the choke portions 50 and 80. Since the choke passages 51 and 81 include the bent portions 51a, there is no need to increase the size of the choke portions 50 and 80 when the flow-passage lengths of the choke passages 51 and 81 are extended. Therefore, the shock absorbers 100 and 200 enable generating a larger damping force in a small size and ensure facilitated manufacturing.

The choke portions 50 and 80 are integrally formed with any of the cylinder 10, the piston rod 30, the piston 20, and the base valve 70.

In this configuration, since the choke portions 50 and 80 are integrally formed with the cylinder 10, the piston rod 30, the piston 20 or the base valve 70, there is no need for a process mounting the choke portions 50 and 80 to the cylinder 10, the piston rod 30, the piston 20 or the base valve 70, in manufacturing the shock absorbers 100 and 200. Therefore, this ensures shortening the manufacturing time for the shock absorbers 100 and 200.

The choke passages 51 and 81 include the bent portions 51a.

In this configuration, since the choke passages 51 and 81 include the bent portions 51a, there is no need to increase the size of the choke portions 50 and 80 when the flow-passage lengths of the choke passages 51 and 81 are extended. Therefore, this ensures downsizing the shock absorbers 100 and 200.

The choke passages 51 and 81 are seamlessly formed in a spiral pattern in the axial direction.

In this configuration, since the choke passages 51 and 81 are seamlessly formed in a spiral pattern in the axial direction, there is no need to increase the size of the choke portions 50 and 80 when the flow-passage lengths of the choke passages 51 and 81 are extended. Cylindrically-shaped ones enable the flow-passage length to be lengthened to a maximum extent. Therefore, it is possible to downsize the shock absorbers 100 and 200.

The inner walls of the choke passages 51 and 81 are integrally formed.

In this configuration, since the inner walls of the choke passages 51 and 81 are integrally formed, it is only necessary to control the dimensional tolerances of the choke passages 51 and 81, and there is no need to severely control the dimensional tolerances of the portions other than the choke passages 51 and 81. Therefore, this ensures facilitated manufacturing of the shock absorbers 100 and 200.

The shock absorbers 100 and 200 further include the screw portions 90 disposed at least one of the cylinder 10, the piston rod 30, the piston 20, and the base valve 70, and the choke portions 50 and 80 are disposed in the screw portions 90.

In this configuration, since the choke portions 50 and 80 are disposed in the screw portions 90, the choke portions 50 and 80 are disposed in the cylinder 10, the piston rod 30, the piston 20, or the base valve 70 only by screwing of the screw portions 90. Therefore, this ensures facilitated manufacturing of the shock absorbers 100 and 200. Even when, in a standard change or similar change, the specification such as the size of the cylinder 10, the piston rod 30, or the piston 20 is changed, it is possible to commonly use the screw portions 90.

The choke passages 51 and 81 include the through passage portions 51b that penetrates the choke portions 50 and 80 and the branch passage portions 51c and 51d that branch from the through passage portion 51b and have openings in the end face 53a of the choke portions 50 and 80. The branch passage portions 51c and 51d are bent.

In this configuration, since the branch passage portions 51c and 51d are bent, there is no need to increase the size of the choke portions 50 and 80 when the flow-passage lengths of the branch passage portions 51c and 51d are extended. Therefore, it is possible to downsize the shock absorbers 100 and 200.

The choke passages 51 and 81 include the first passage portions 51e, the second passage portions 51f, and the coupling portions 51g. The first passage portions 51e linearly extend from the openings of the choke passages 51 and 81. The second passage portions 51f linearly extend along the first passage portions 51e. The coupling portions 51g couple the first passage portions 51e to the second passage portions 51f and change the direction of the flow of the working oil to the opposite direction.

In this configuration, since the coupling portions 51g couple the first passage portions 51e to the second passage portions 51f and change the direction of the flow of the hydraulic oil to the opposite direction, there is no need to increase the size of the choke portions 50 and 80 when the flow-passage lengths of the choke passages 51 and 81 are extended. Therefore, it is possible to downsize the shock absorbers 100 and 200.

The choke passages 51 and 81 include the first passage portions 51e, the plurality of second passage portions 51h, the first coupling portions 51i, and the second coupling portions 51j. The first passage portions 51e linearly extend from the openings of the choke passages 51 and 81. The plurality of second passage portions 51h linearly extend in the direction intersecting with the extension direction of the first passage portions 51e. The first coupling portions 51i couple the first passage portion 51e to one of the plurality of second passage portions 51h. The second coupling portions 51j mutually couple the second passage portions 51h and change the direction of the flow of the hydraulic oil to the opposite direction.

In this configuration, since the first and second coupling portions 51i and 51j change the direction of the flow of the hydraulic oil, there is no need to increase the size of the choke portions 50 and 80 when the flow-passage lengths of the choke passages 51 and 81 are extended. Therefore, it is possible to downsize the shock absorbers 100 and 200.

The choke portions 50 and 80 are formed separately from the cylinder 10, the piston rod 30, the piston 20, and the base valve 70, and are mounted to any of the cylinder 10, the piston rod 30, the piston 20, or the base valve 70.

In this configuration, the choke portions 50 and 80 are separated from the cylinder 10, the piston rod 30, the piston 20, and the base valve 70, and are mounted to the cylinder 10, the piston rod 30, the piston 20, or the base valve 70. The choke passages 51 and 81 are formed by such choke portions 50 and 80. Consequently, when the flow-passage lengths or the shapes of the choke passages 51 and 81 are changed, it is only necessary to replace the choke portions 50 and 80, and there is no need to apply changes to the cylinder 10, the piston rod 30, the piston 20, and the base valve 70. Therefore, this ensures enhanced versatility of the shock absorbers 100 and 200.

Embodiments of this invention were described above, but the above embodiments are merely examples of applications of this invention, and the technical scope of this invention is not limited to the specific constitutions of the above embodiments.

This application claims priority based on Japanese Patent Application No. 2015-180974 filed with the Japan Patent Office on Sep. 14, 2015, the entire contents of which are incorporated into this specification.

The invention claimed is:

1. A shock absorber, comprising:
a cylinder in which a working fluid is sealed;
a piston rod movable into and out of the cylinder, the piston rod extending from the cylinder;
a piston disposed inside the cylinder, the piston being configured to partition a first fluid chamber and a second fluid chamber;
a choke portion including a seamless choke passage and being configured to allow the working fluid to communicate between the first fluid chamber and the second fluid chamber; and
a screw portion mounted to a hole disposed in one of the cylinder, the piston rod or the piston, the choke portion being disposed within the screw portion, the screw portion including
a threaded shaft portion engaged with a threaded inner peripheral surface of the hole, and
a head portion provided on an end of the shaft portion, wherein
the choke passage is comprised of only a single member, and penetrates between an end face of the shaft portion of the screw portion and an end face of the head portion of the screw portion, the choke passage having a non-linear shape, and
a length of the choke passage is greater than a distance between the end face of the shaft portion of the screw portion and the end face of the head portion of the screw portion.

2. The shock absorber according to claim 1, wherein the choke passage includes a bent portion.

3. The shock absorber according to claim 1, wherein the choke passage is formed in a spiral pattern in an axial direction.

4. The shock absorber according to claim 1, wherein the choke passage includes:
a through passage portion formed to penetrate the screw portion; and
a branch passage portion formed to branch from the through passage portion, the branch passage portion having an opening in an outer peripheral surface of the choke portion, the branch passage portion being bent.

5. The shock absorber according to claim 1, wherein the screw portion is engaged with the one of the cylinder, the piston rod or the piston so that the choke portion is installed in the one of the cylinder, the piston rod or the piston.

6. A shock absorber, comprising:
a cylinder in which a working fluid is sealed;
a piston rod movable into and out of the cylinder, the piston rod extending from the cylinder;
a piston disposed inside the cylinder, the piston being configured to partition a first fluid chamber and a second fluid chamber;
a choke portion including a seamless choke passage and being configured to allow the working fluid to communicate between the first fluid chamber and the second fluid chamber; and
a screw portion mounted to a hole disposed in one of the cylinder, the piston rod or the piston, the choke portion being disposed within the screw portion, the screw portion including
a threaded shaft portion engaged with a threaded inner peripheral surface of the hole, and
a head portion provided on an end of the shaft portion, wherein
the choke passage is comprised of only a single member, and penetrates between an end face of the shaft portion of the screw portion and an end face of the head portion of the screw portion, the choke passage having a non-linear shape, and
the choke passage includes:
a first passage portion linearly extending from an opening of the choke passage;
a second passage portion linearly extending along the first passage portion; and
a coupling portion configured to couple the first passage portion to the second passage portion, the coupling portion being configured to change a direction of a flow of a working fluid to an opposite direction.

7. A shock absorber, comprising:
a cylinder in which a working fluid is sealed;
a piston rod movable into and out of the cylinder, the piston rod extending from the cylinder;
a piston disposed inside the cylinder, the piston being configured to partition a first fluid chamber and a second fluid chamber;
a choke portion including a seamless choke passage and being configured to allow the working fluid to communicate between the first fluid chamber and the second fluid chamber; and
a screw portion mounted to a hole disposed in one of the cylinder, the piston rod or the piston, the choke portion being disposed within the screw portion, the screw portion including
a threaded shaft portion engaged with a threaded inner peripheral surface of the hole, and
a head portion provided on an end of the shaft portion, wherein
the choke passage is comprised of only a single member, and penetrates between an end face of the shaft portion of the screw portion and an end face of the head portion of the screw portion, the choke passage having a non-linear shape, and
the choke passage includes:
a first passage portion linearly extending in a first direction from the first fluid chamber to the second fluid chamber;

a plurality of second passage portions linearly extending in a second direction intersecting with the first direction;
a first coupling portion connecting the first passage portion to one of the plurality of second passage portions; and
a second coupling portion connecting two adjacent ones of the second passage portions, the second coupling portion being configured to change the direction of the flow of the working fluid to the opposite direction.

* * * * *